June 11, 1935. E. G. LUENING 2,004,491
PIPE BEND
Filed Aug. 2, 1933
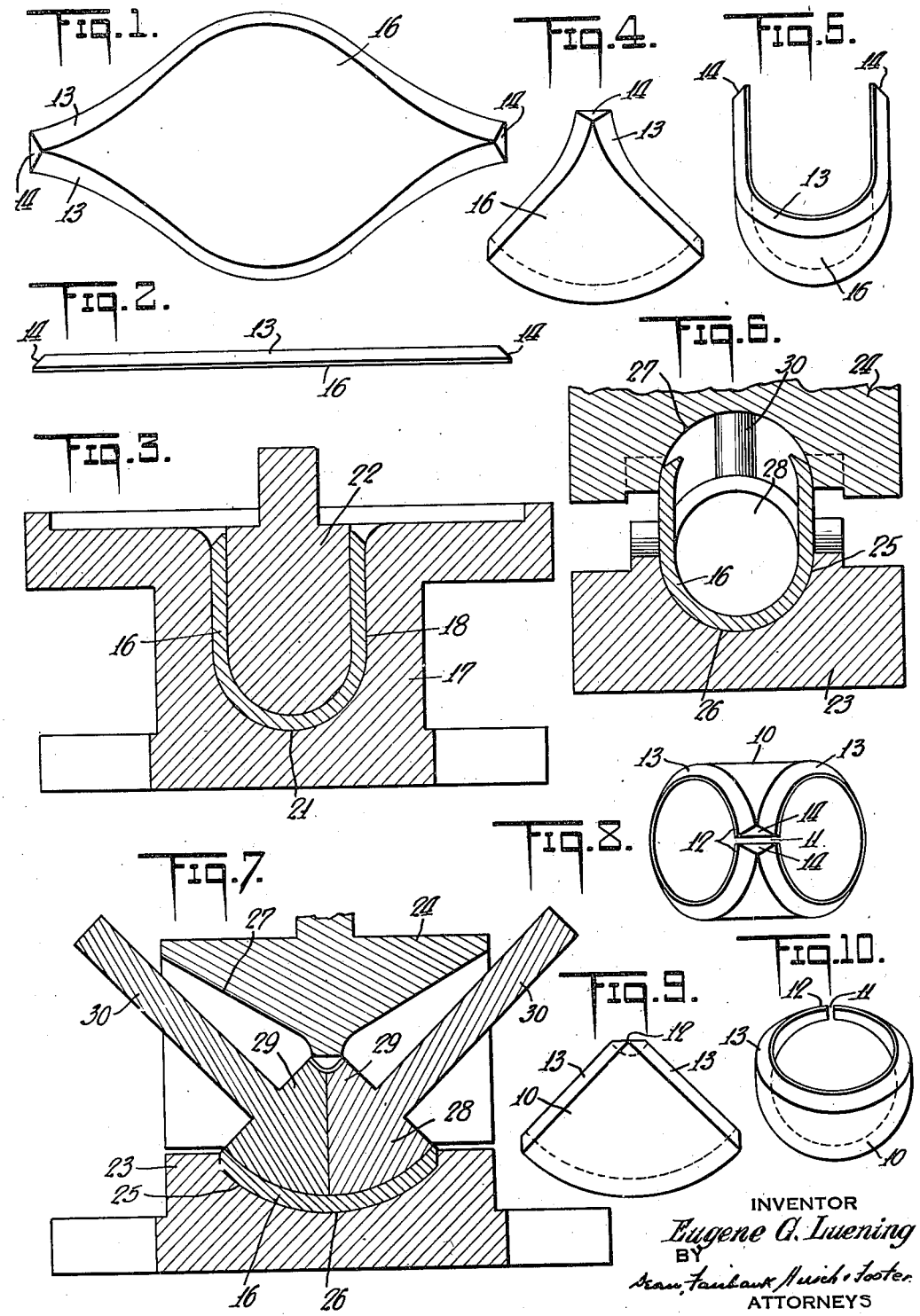
INVENTOR
Eugene G. Luening
BY
ATTORNEYS Patented June 11, 1935

2,004,491

UNITED STATES PATENT OFFICE 2,004,491

PIPE BEND

Eugene G. Luening, Louisville, Ky., assignor to The Girdler Corporation, Louisville, Ky., a corporation of Delaware Application August 2, 1933, Serial No. 683,265

1 Claim. (Cl. 137—75)

This invention relates to pipe fittings and more particularly to pipe bends adapted to be welded in position.

One object of the present invention is to provide, as a new article of manufacture, a pipe bend which may be inexpensively constructed, which may be welded to a pipe end without setting up any objectionable stresses incident to the circumferential expansion caused by the welding operation, and which may be easily and economically welded by a short, simplified operation.

My improved pipe bend is provided with an open longitudinal seam at its inner section and as so constructed is adapted to be supplied as a finshed article of manufacture, the open seam being welded in the field at the same time the bend is welded in position to a pipe end. During the circumferential welding of the pipe bend in position, this bend tends to expand circumferentially under the influence of the welding heat. The open seam in my improved construction permits the free circumferential expansion of the bend, thereby preventing objectionable stresses from being set up in said bend and permitting a more exact fit to be effected.

As an important feature of the present invention, the pipe bend is of short radius, that is the inner section of the bend is close to the center of curvature of the bend so that the longitudinal seam along this inner section is comparatively short. The longitudinal dimension of the inner section is substantially such that when the circumferential weld between one end of the pipe bend and another pipe is continued transversely across the seam, substantially one-half of the length of said seam will be welded. This seam will thereby be welded substantially across its entire length by the same operations which circumferentially weld both ends of the bend to the pipes, thereby eliminating the necessity of any additional welding operation along the seam.

My improved pipe bend is constructed from a minimum amount of material and lends itself readily to easy and economical manufacture, this pipe bend being advantageously stamped from a metal blank through the use of dies.

In the accompanying drawing, there is shown for the purpose of illustration, one form of pipe bend embodying my invention, and there is also illustrated one method by means of which this pipe bend may be made. In the drawing:

Fig. 1 is a plan view of the outside of a blank from which my improved pipe bend is constructed.

Fig. 2 is a side elevation of the blank shown in Fig. 1.

Fig. 3 is a transverse section of a die, and shows the blank of Figs. 1 and 2 being subjected to a preliminary bending operation.

Figs. 4 and 5 show side and front views respectively of a U-shaped blank formed by the operation illustrated in Fig. 3.

Figs. 6 and 7 illustrate subsequent bending operations and show the bending dies in transverse and longitudinal sections respectively, and Figs. 8, 9 and 10 are top, side and front views respectively of the finished pipe bend after being subjected to the bending operations illustrated in Figs. 6 and 7.

My improved pipe bend 10, as shown in Figs. 8, 9 and 10, is provided with an open longitudinal seam 11 at its inner section 12. The bend 10 has a radius of curvature sufficiently short so that the inner section 12 of said bend is close to the center of curvature. This construction results in a short seam 11, the length of this seam being substantially equal to the width of a standard pipe joint weld. I have found that a seam having a length not substantially greater than three times the thickness of the material is effective for the purpose of my invention.

In order to facilitate the welding of the pipe bend 10 in position, there are provided beveled surfaces 13 at both ends thereof. When the bend 10 is mounted in alined welding position with the pipe to which it is to be connected, these beveled surfaces 13 cooperate with similar beveled surfaces on said pipe to form V-shaped grooves in which the circumferential welds are formed. The sections of the bend 10 opposite to the seam 11 are provided with beveled surfaces 14 forming therebetween a V-shaped groove for the reception of a weld.

In welding the pipe bend 10 to a pipe section, said bend is alined in welding position with said pipe section and circumferentially welded at one end to said section. The circumferential weld is continued transversely across the seam 11, thereby welding substantially one-half of the length of the seam. When the other end of the bend is circumferentially welded in position, the weld is similarly continued transversely across the seam to weld the remaining length of said seam. The seam 11 will thereby be welded simultaneously with the circumferential welding of the pipe bend in position without the necessity of additional welding operation along the seam.

Another advantage in a pipe bend of this construction is the facility and economy with which it may be manufactured, this type of bend being advantageously stamped or pressed from a metal blank by the method illustrated in Figs. 1 to 7. In accordance with this method, there is provided a metal blank 16 constituting a development of the bend shown in Figs. 8 to 10, and having an enlarged middle section for forming the outer curved section, and having end sections of comparatively short widths to form the short inner section of the bend. The blank 16 is beveled around its entire periphery as shown to form the beveled surfaces 13 and 14 of the final product.

The blank is initially bent into the approximate U-shaped form shown in Figs. 4 and 5 by the operation illustrated in Fig. 3. For effecting this preliminary bending operation, there is provided a lower die member 17 having a recess 18 which is substantially U-shaped in transverse section as shown, and which has a base 21 curved longitudinally to conform with the curvature of the outer section of the final product. Cooperating with the lower die member 17 is an upper die member 22 substantially conforming in shape with the recess 18, and adapted to move into said recess to bend the blank 16 into the U-shape shown in Figs. 4 and 5.

The U-shaped blank shown in Figs. 4 and 5 is then subjected to the final bending operation shown in Figs. 6 and 7 to form the article of manufacture shown in Figs. 8, 9 and 10. For that purpose, there is provided a die comprising a lower die member 23 and an upper die member 24 cooperating therewith. The lower die member 23 has a recess 25 which, in transverse section, is substantially semi-cylindrical as shown in Fig. 6, and in longitudinal section has a base 26 curved in accordance with the outer longitudinal curvature of the final product. The upper die member 24 has a recess 27 which, in transverse section, is semi-cylindrical and complemental to the recess 25, and in longitudinal section is substantially frusto-conical with the base of the recess constituting its smallest dimension and substantially equal to the length of the inner section of the final bend.

In performing the final bending operation, the U-shaped blank shown in Figs. 4 and 5 is seated in the recess 25 of the lower die member 23, and a core 28 is seated in said blank, around which the blank is to be wound or formed. This core is advantageously split to form two members 29 adapted to be positioned in abutting relationship with each other as shown in Fig. 7 and shaped to conjointly conform with the interior of the pipe bend. These members 29 are provided with handles 30 by means of which they are held in position by the operator during the final bending. These handles also serve to facilitate the removal of the members 29 from the interior of the final product.

The upper die member 24 is then lowered to close the upper ends of the U-shaped blank around the core 28 until the blank has been shaped into the form shown in Figs. 8 to 10. It will be noted that in the final form, the ends of the blank are interspaced a very small distance in order to permit free circumferential expansion of the bend during welding operations.

The bend is of such small radius as to permit the use of a core having a surface which engages the entire internal surface of the final bend, so that the blank may be pressed to form a pipe bend which is relatively uniform in cross-section and relatively free from buckles, wrinkles and other irregularities on the inside or outside surface of the bend.

Having thus described my invention, what I claim as new and desire to secure by Letters Patent is:—

As an article of manufacture, a pipe fitting formed from a sheet bent to approximately a sector of a circle with the junction line forming a slit at approximately the center of said circle, whereby said bend may be expanded or contracted when welding the ends thereof to pipe sections and the like, with the walls of the slit adapted to be welded together along said slit at the same time.

EUGENE G. LUENING.